United States Patent
Chrysochoos et al.

Patent Number: 5,824,993
Date of Patent: Oct. 20, 1998

[54] ARRANGEMENT FOR HEATING AN AUTOMOBILE GLAZING UNIT

[75] Inventors: Michael J. Chrysochoos, Toledo, Ohio; Adrian G. Vanoostveen, Fairfield Glade, Tenn.

[73] Assignee: Ford Motor Company, Dearborn, Mich.

[21] Appl. No.: 435,026

[22] Filed: May 4, 1995

[51] Int. Cl.⁶ .................................................. B60L 1/02
[52] U.S. Cl. ........................ 219/203; 219/547; 219/541
[58] Field of Search .................................. 219/202, 203, 219/522, 539, 541, 547, 548

[56] References Cited

U.S. PATENT DOCUMENTS

| | | | |
|---|---|---|---|
| Re. 32,218 | 7/1986 | Kunert | 219/203 |
| 2,065,760 | 12/1936 | Smith | 219/547 |
| 2,173,263 | 9/1939 | Nier | 219/539 |
| 2,895,157 | 7/1959 | Kocourek | 15/253 |
| 3,553,833 | 1/1971 | Jochim et al. | 219/203 |
| 3,738,252 | 6/1973 | Cardinale | 98/2.1 |
| 3,789,191 | 1/1974 | Spindler | 338/24 |
| 3,789,192 | 1/1974 | Spindler | 219/522 |
| 3,813,519 | 5/1974 | Jochim et al. | 219/522 |
| 3,974,359 | 8/1976 | Orcutt et al. | 219/522 |
| 3,974,360 | 8/1976 | Panzarino | 219/543 |
| 3,995,142 | 11/1976 | Ciardelli et al. | 219/522 |
| 4,004,126 | 1/1977 | Boaz | 219/203 |
| 4,057,707 | 11/1977 | Allen | 219/543 |
| 4,109,044 | 8/1978 | Marriott | 219/203 |
| 4,109,133 | 8/1978 | Hanle et al. | 219/203 |
| 4,315,134 | 2/1982 | Matsuzaki et al. | 219/203 |
| 4,373,130 | 2/1983 | Krasborn et al. | 219/203 |
| 4,378,484 | 3/1983 | Kunert | 219/203 |
| 4,385,226 | 5/1983 | Sauer | 219/522 |
| 4,388,522 | 6/1983 | Boaz | 219/522 |
| 4,725,710 | 2/1988 | Ramus et al. | 219/203 |
| 4,743,741 | 5/1988 | Ramus | 219/543 |
| 4,786,784 | 11/1988 | Nikodem et al. | 219/543 |
| 4,820,902 | 4/1989 | Gillery | 219/203 |
| 4,902,875 | 2/1990 | Koontz | 219/203 |
| 4,910,380 | 3/1990 | Reiss et al. | 219/203 |
| 4,934,013 | 6/1990 | Jacoby | 15/250 |
| 4,939,348 | 7/1990 | Criss | 219/547 |
| 4,940,884 | 7/1990 | Gillery | 219/203 |
| 4,971,848 | 11/1990 | Ruelle et al. | 219/203 |
| 4,994,650 | 2/1991 | Koontz | 219/497 |
| 5,007,130 | 4/1991 | Jacoby | 15/250 |
| 5,070,230 | 12/1991 | Osada et al. | 219/203 |
| 5,099,104 | 3/1992 | Holzer et al. | 219/203 |
| 5,099,105 | 3/1992 | Goerenz et al. | 219/203 |
| 5,182,431 | 1/1993 | Koontz et al. | 219/203 |
| 5,208,444 | 5/1993 | Winter et al. | 219/547 |
| 5,386,098 | 1/1995 | Knudsen | 219/203 |
| 5,481,400 | 1/1996 | Borden | 219/203 |

FOREIGN PATENT DOCUMENTS

| | | | |
|---|---|---|---|
| 588397 | 12/1959 | Canada . | |
| 0520353 | 12/1992 | European Pat. Off. | 219/203 |
| 737058 | 9/1953 | Germany . | |
| 1540464 | 2/1979 | United Kingdom | 219/547 |

OTHER PUBLICATIONS

English translation of Welteroth, PN 0520353, cited as document "L" in Paper No. 5.

*Primary Examiner*—Michael L. Gellner
*Assistant Examiner*—Karl Easthom
*Attorney, Agent, or Firm*—Lorraine S. Melotik; Roger L. May

[57] ABSTRACT

A novel arrangement for electrically heating the lower section of an automobile glazing unit is disclosed. An embodiment of the arrangement includes a heating grid pattern employing vertical shorting bars to prevent complete inoperability of individual heating conductors. An alternate embodiment of the arrangement includes heating conductors of varying electrical resistance to achieve greater heat generation at desired locations.

10 Claims, 2 Drawing Sheets

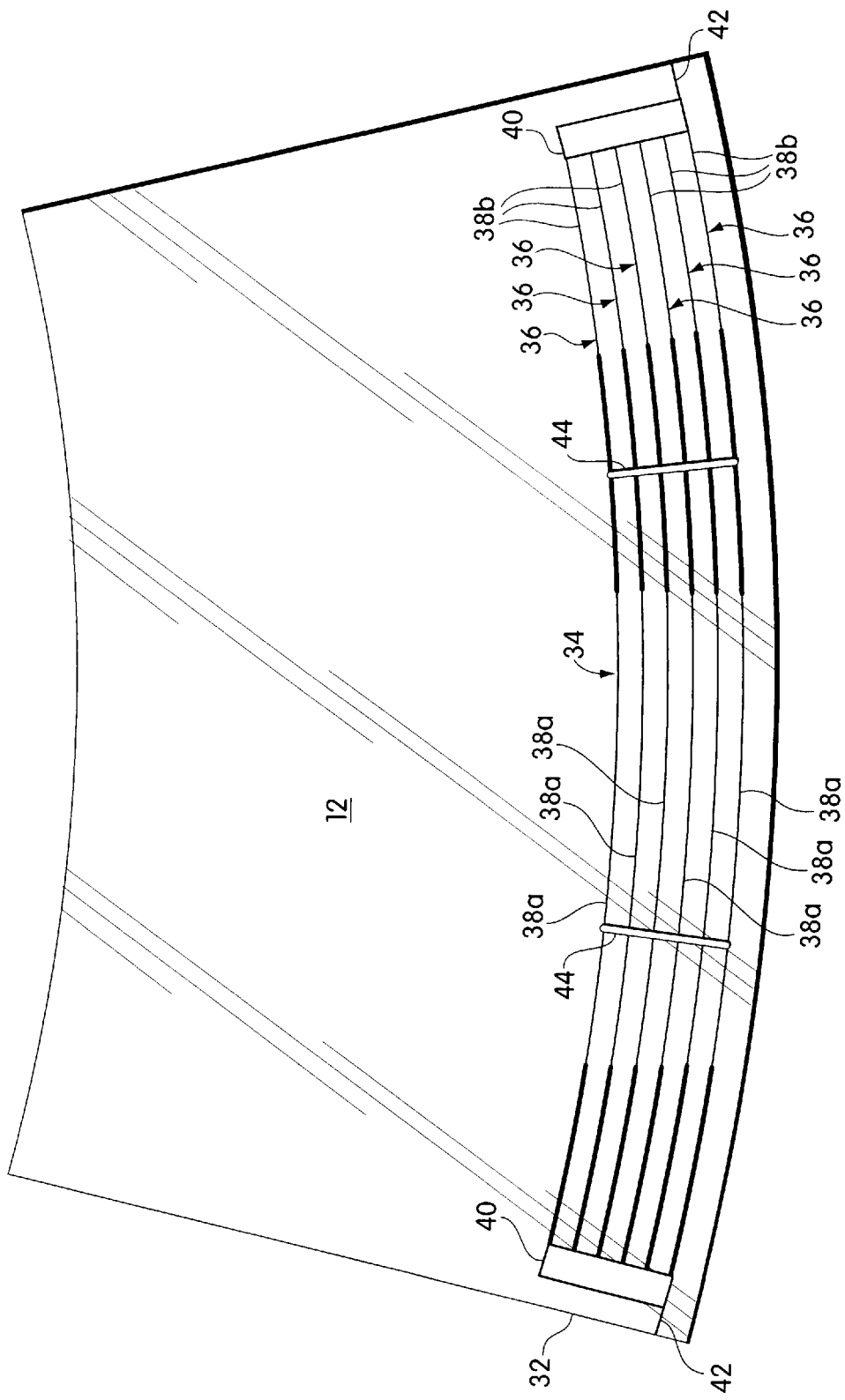

ARRANGEMENT FOR HEATING AN AUTOMOBILE GLAZING UNIT

BACKGROUND OF THE INVENTION

1. Field of the Invention

Embodiments of the present invention relate generally to an arrangement for electrically heating a lower section of an automobile glazing unit. More particularly, embodiments of the present invention relate to an arrangement for heating a section of automobile glazing corresponding to a windshield wiper rest area. In one aspect, the present invention relates to a novel heating grid employing vertical shorting bars. In a further aspect, the novel heating grid employs heating conductors of varying electrical resistance.

2. Description of Related Art

Arrangements for electrically heating parking areas for windshield wipers are known. For example U.S. Pat. Nos. 5,386,098, and 4,004,126 disclose an electric heating grid placed against the inside surface of a windshield. U.S. Pat. No. 4,109,133 discloses single and multiple wire heating lines embedded in a rear automobile window. U.S. Pat. No. 4,373,130 discloses heating lines sandwiched between opaque ceramic heat absorbing layers.

However, these arrangements suffer disadvantages in that they are designed to heat a windshield area without concern to whether more heat should be directed to a desired location to achieve faster and more complete heating of, for example, a windshield wiper rest area. Additionally, these arrangements are subject to undesirable performance should one or more of the heating lines break causing insufficient heating along an entire length of the heating line. Consequently, an arrangement for electrically heating a windshield wiper rest area is needed which overcomes the disadvantages of the prior art.

SUMMARY OF THE INVENTION

Embodiments of the present invention relate generally to an arrangement for electrically heating a lower section of an automobile glazing unit, particularly at the area of the automobile glazing unit corresponding to the wiper rest area. An electrically resistant grid pattern is in thermal contact with an area of an automobile glazing unit which includes an area corresponding to a windshield wiper rest position.

The grid pattern has a plurality of horizontally spaced resistance heating conductors and a set of vertically spaced shorting bars electrically connected to each of the heating conductors in a manner to allow the shorting bars to conduct electrical current when current flow through the heating conductors is interrupted. The heating conductors are electrically connected to and are energized by a means for energizing the grid pattern.

Embodiments of the present invention are advantageous in that they provide a heated wiper rest arrangement for facilitating the removal of frozen snow and/or ice, which may compromise wiper blade operation, from the lower portion of an automobile glazing unit including the area corresponding to the wiper rest area of the automobile glazing unit. The arrangement of the present invention also advantageously operates to free up wiper blades which may become frozen to the windshield without the operator having to exit the automobile. Embodiments of the present invention are further advantageous in that they employ shorting bars in an electrically resistant grid pattern to allow the grid pattern to function despite having an interruption in the flow of electricity through one or more heating conductors. This feature is especially important when repair or replacement of the grid pattern is difficult since it allows effective performance of the heating grid despite possible failure of one or more of the heating conductors. Embodiments of the present invention are still further advantageous in that they employ heating conductors having a varying electrical resistance to deliver additional heat to areas of the automotive glazing unit which may require more heat, such as the area directly corresponding to the windshield wiper rest position, while also providing heat to the lower portion of the automobile glazing unit to assist in the removal of frozen snow and/or ice from areas not directly corresponding to the wiper rest position.

It is accordingly an object of the present invention to provide an arrangement for improving the heated removal of snow and ice from the lower portion of an automobile glazing unit. It is an additional object of the present invention to provide an arrangement for improving the heated removal of snow and ice from an area of the automobile glazing unit directly corresponding to the windshield wiper blade rest area. It is a further object of the present invention to provide an arrangement for freeing up windshield wiper blades which may become frozen to the surface of an automobile glazing unit. It is a still further object of the present invention to improve the reliability and performance of heated grid patterns in removing snow and ice from automobile glazing units.

Other objects, features or advantages of the present invention will become apparent from the following description taken in conjunction with the accompanying drawings.

BRIEF DESCRIPTION OF THE DRAWINGS

In the course of the detailed description of certain preferred embodiments to follow, reference will be made to the attached drawings, in which.

FIG. 2 is an interior plan view of the automobile glazing front windshield unit showing a grid pattern of the present invention.

DETAILED DESCRIPTION OF PREFERRED EMBODIMENTS

Figure 1:
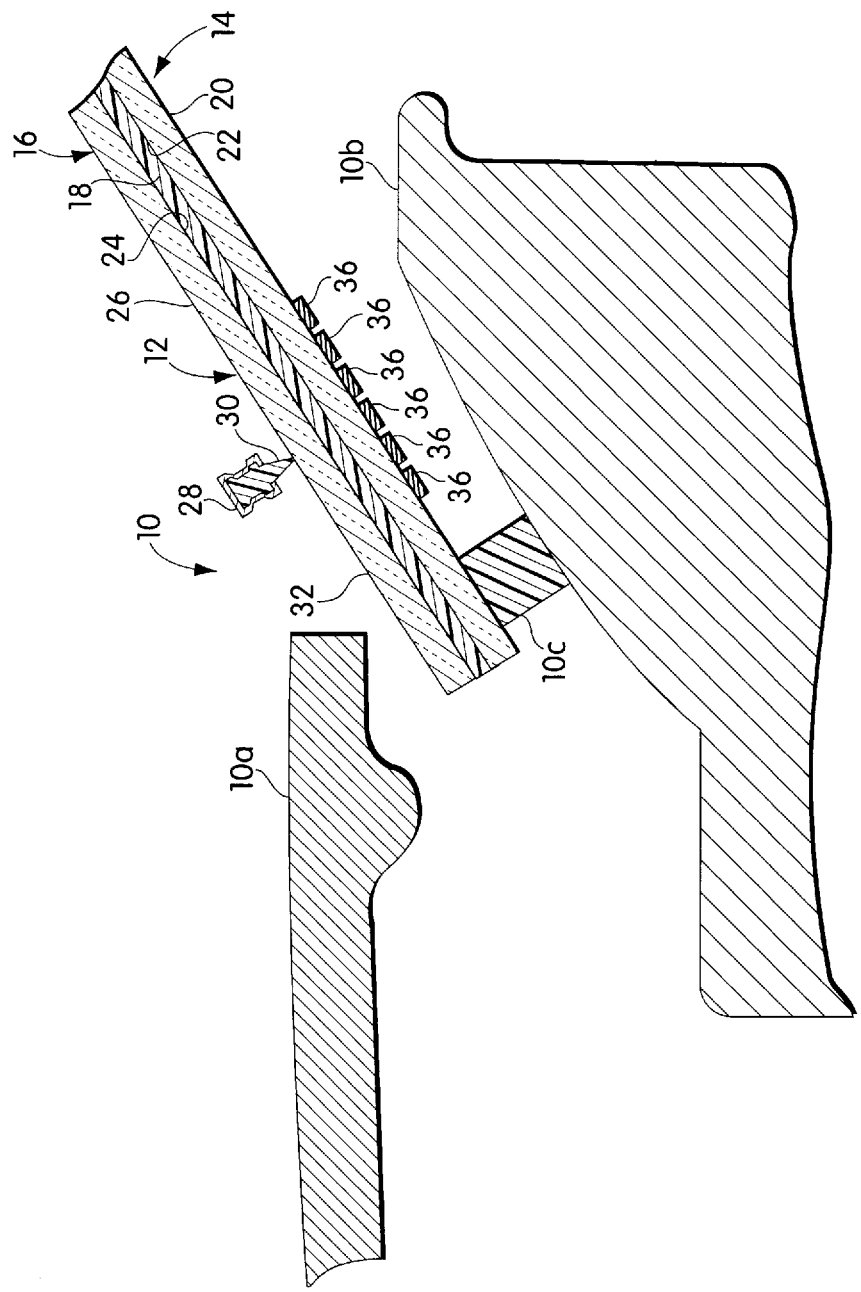
FIG. 1 is a partial side elevational view in cross-section of an automobile glazing front windshield unit showing positioning of the grid pattern of the present invention.

The principles of the present invention may be applied with particular advantage to provide an arrangement for electrically heating a lower section of an automobile glazing unit. As can be seen in cross-section in FIG. 1, the arrangement of the present invention includes an automobile, a section of which is shown generally in a side elevational view at 10 comprising a automobile hood 10a, dash board section 10b, spacing element 10c and an automobile glazing unit 12, which for purposes of example only, is depicted as a front automobile windshield. The automobile glazing unit 12 is of the type which is laminated having an interior glass panel 14 and an exterior glass panel 16 sandwiching and bonding an intermediate layer 18 formed from thermoplastic materials well known in the art. The automobile glazing unit 12, therefore, has interior surface 20, first middle surface 22, second middle surface 24, and exterior surface 26.

As can be further seen in FIG. 1, windshield wiper 28 having windshield wiper blade 30 is a conventional windshield wiper arrangement with the blade 30 being formed from rubber or synthetic rubber material. The windshield wiper 28 rests in a parked mode in an area at a lower section 32 of automobile glazing 12. A second windshield wiper (not shown) also rests in a parked mode in an area at the lower section 32 of automobile glazing unit 12. When activated, the windshield wiper blades traverse the automobile glazing unit 12 to clear water or debris from the operator's field of vision. It is to be understood that one of ordinary skill in the art will be able to apply the teachings of the present invention to any automobile glazing unit, i.e. whether front, side or rear, which is equipped with a windshield wiper arrangement.

When the windshield wiper blades are in their parked position at the lower section 32, snow or ice may accumulate upon the windshield wiper blades and can result in their adherence to the exterior surface 26 of automobile glazing unit 12. Embodiments of the present invention are directed to providing an arrangement including a heating grid pattern which effectively, reliably, inexpensively and in a relatively rapid response time, facilitates the removal of snow or ice and helps free up the windshield wiper blades frozen to the surface of the automobile glazing unit.

As can be seen in cross-section in FIG. 1 and more completely in FIG. 2, one embodiment of the present invention employs an electrically resistant grid pattern shown generally at 34 which is disposed in alignment with an area of the lower section 32 of automobile glazing unit 12. The grid pattern 34 is also disposed in alignment with an area proximate to where the windshield wiper blades rest in their parked position. The grid pattern 34 is in thermal contact with the automobile glazing unit 12. When electricity is allowed to flow through the electrically resistant grid pattern, heat is generated to locally heat the automobile glazing unit 12 at the lower section 32 including the area where the windshield wiper blades are parked.

In a preferred embodiment which is shown in FIG. 2, the electrically resistant grid pattern 34 has a plurality of horizontally spaced resistance heating conductors 36, also shown in cross-section in FIG. 1. The heating conductors 36 substantially traverse, in parallel, the length of the automobile glazing unit 12 at lower section 32. The heating conductors 36 are preferably equally horizontally spaced but may have a spacing arrangement which varies according to desired heating characteristics. For example, the heating conductors 36 may be more closely spaced in an area of the automobile glazing unit 12 directly corresponding to the windshield wiper rest area, thereby providing a greater watt density per square inch of glazing surface and greater heating capacity. Typically, the heating conductors 36 are spaced about 0.25 inches to about 0.75 inches apart. In a preferred embodiment, the heating conductors are spaced about 0.50 inches apart.

Although, six heating conductors 36 are shown in FIGS. 1 and 2, the number of heating conductors 36 may vary according to desired heating characteristics. For example, two or three heating conductors may be sufficient to heat a smaller windshield wiper rest area, while four, five, six, seven or more heating conductors may be required to heat a larger windshield wiper rest area. It is to be understood that the practice of the present invention is not limited to any particular number of heating conductors, but that one of ordinary skill in the art may apply any number of heating conductors sufficient to provide a desired wattage density to sufficiently heat a desired automobile glazing area.

The heating conductors 36 may be formed from any materials which promote electrical conductance and have an electrical resistance so as to generate useful heat. For example, the heating conductors 36 may be formed from metal wire, such as copper, aluminum, nickel, gold, silver, tungsten or platinum or they may be fashioned from either enamel or ceramic materials made conductive by deposits of the above metals, such as silver, disposed therein. Various compositions of such enamels or ceramics for the purpose of providing electrically conductive channels are well known to those skilled in the art. The enamel or ceramic materials are deposited on and bonded to the desired glazing surface using methods well known in the art, i.e. such as conventional silk screen printing methods.

In one embodiment of the present invention, the heating conductors 36 are formed from conductive ceramic materials having a thickness of about 0.005 inches to about 0.007 inches and a width of about 0.010 inches to about 0.060 inches. Typically, heating conductors 36 have a width of between about 0.025 inches to about 0.040 inches. Should the heating conductors be fashioned from electrically conductive wire, then they will have a diameter corresponding to the above described widths.

In an alternate embodiment of the present invention, the heating conductors 36 are designed to maximize the power density of the grid pattern 34 in the area where the wiper blades directly rest against the automobile glazing 12 unit. This can be accomplished according to the present invention in at least two ways. As depicted in FIG. 2, the heating conductors 36 may be tapered to thinner heating conductor sections 38a and 38b at positions directly at or near each wiper blade. Tapering can be achieved by methods well known in the screen printing art, if the heating conductors 36 are formed from ceramic materials. Alternatively, wire can be tapered to a thinner diameter or two wires of differing diameters can be bonded together. The thinner heating conductor sections 38a and 38b have a higher resistance per inch than the remaining heating conductor sections, and therefore, will generate more heat where needed, i.e. directly at the wiper rest area. In a preferred embodiment the thinner heating sections will have a width of about 0.005 inches to about 0.020 inches.

The power density may also be maximized at the wiper blade rest position by varying the conductive composition of the heating conductor at that position. For example, the composition of the heating conductor may include a material having a higher electrical resistance at the wiper rest position than the remainder of the heating conductor thereby generating a greater amount of heat. This can be accomplished by varying the composition of the enamel or ceramic material when it is being deposited at a desired location.

As can be further seen in FIG. 2, heating conductors 36 are electrically connected at each end to substantially vertical bus bars 40 which energize the grid pattern. As with the heating conductors 36, the bus bars 40 are formed from electrically conductive materials such as wire or deposited enamel or ceramic materials as discussed above. The bus bars 40 are conventional bus bars having electrical leads 42 which are connected to an electrical power source (not shown). The bus bars 40 are at the extreme side edges of automobile glazing 12 so as not to interfere with the operator's field of vision. In a preferred embodiment, the bus bars 40 are formed from conductive ceramic materials having a width of about 0.25 inches to about 0.75 inches, preferably, 0.5 inches. The height of each bus bar is dependent upon the number of heating conductors 36 making up the grid pattern 34. In a preferred embodiment, the bus bars are designed to conduct electricity without generating a significant amount of heat.

The grid pattern 34 of FIG. 2 also shows vertical shorting bars 44 which intersect each of the heating conductors 36 at an equipotential point. The shorting bars 44 are therefore electrically connected to each heating conductor 36 but in a manner which allows the shorting bars 44 to conduct electrical current only when current flow through the heating conductors is interrupted due to breakage or other causes of current flow interruption. As such, the shorting bars 44 do not conduct electricity during normal operation of the grid pattern 34 since they interconnect each heating conductor at a point where the voltage potential is the same. The shorting bars 44 are advantageously employed in the arrangement of the present invention to prevent the total inoperability of particular heating conductors should one or more heating conductors become damaged. The shorting bar acts to conduct or "shunt" the electrical current around the damaged area so that the heating conductor and the heating grid pattern remains effectively operative. This is especially important when the location of the grid pattern precludes ease of repair. Although two shorting bars 44 are depicted in FIG. 2, it is to be understood that multiple shorting bars may be advantageously employed as desired at various positions along the grid pattern 34 depending upon the length of the automobile glazing unit 12, the length of the grid pattern 34 and the extent of shunting that is desired.

As with the heating conductors 36 and the bus bars 40, the shorting bars 44 are formed from electrically conductive materials such as wire or deposited enamel or ceramic materials as discussed above. In a preferred embodiment, the shorting bars 44 are generally wider than the heating conductors as shown in FIG. 2, since their primary function is to carry current in the event of breakage of a heating conductor and not to generate heat. In a further preferred embodiment, the shorting bars 44 are formed from conductive ceramic materials having a width of about 0.030 inches to about 0.060 inches, and more preferably about 0.040 inches. The height of each shorting bar 44 is dependent upon the number of heating conductors 36 making up the grid pattern 34. If enamel or ceramic materials are used, the shorting bars 44 may be deposited along with the heating conductors 36 and bus bars 40.

The grid patterns of the present invention may be advantageously installed either in wire form or as deposited enamels or ceramics at several locations to be effective in heating the lower section 32 of the automobile glazing unit 12 and the parking position area of the windshield wiper blades. The grid patterns may be placed at the interior surface 20, the exterior surface 26 or they may be preferably disposed within the automotive glazing at the first middle surface 22, the second middle surface 24 or installed directly into the intermediate layer 18. All that is required is that the grid pattern 34 be in thermal contact with an area of an automobile glazing unit. It is recognized, however, that placement of the grid pattern at the interior surface 20, the first middle surface 22, the second middle surface 24 or the interior of the intermediate layer 18 avoids the harmful effects of direct weather conditions associated with mounting the grid pattern to the exterior surface 26 of the automobile glazing unit 12. In a preferred embodiment, the heating conductors 36 of grid pattern 36 are shown in cross section in FIG. 1 to be placed on the interior surface 20 of the automobile glazing unit 12 so as to facilitate repair or replacement of the grid pattern 34 when needed.

Although FIG. 2 depicts a single grid pattern, it is to be understood that two or more grid patterns may be employed in series or in parallel to produce a useful heating arrangement in accordance with the teachings of the present invention.

It is to be understood that the embodiments of the invention which have been described are merely illustrative of some applications of the principles of the invention. Numerous modifications may be made by those skilled in the art without departing from the true spirit and scope of the invention.

What is claimed is:

1. An arrangement comprising
   a glazing unit having a lower section
   an electrically resistant grid pattern in thermal contact with an area of the lower section of the glazing unit, the grid pattern having a plurality of horizontally spaced resistance heating conductors;
   bus bars disposed along and electrically connecting opposite edges of each of the heating conductors with the bus bars being connected to a power source to provide current flow through the bus bars and the heating conductors; and
   a set of vertically spaced shorting bars electrically intersecting at least two of the heating conductors at respective points having equal voltage potentials and having an absence of current flow through the vertically spaced shorting bars upon the power source providing current flow through the bus bars and the heating conductors, each vertically spaced shorting bar having an insignificant resistivity as compared to the heating conductors such that insignificant heat is generated upon current flow through each shorting bar as compared to heat generated by each heating conductor.

2. The arrangement of claim 1 wherein the heating conductors comprise metal wires.

3. The arrangement of claim 1 wherein the heating conductors comprise electrically conductive enamel or ceramic materials.

4. The arrangement of claim 1 wherein the electrical resistance of the heating conductors is variable.

5. The arrangement of claim 1 wherein the heating conductors have a varying width.

6. The arrangement of claim 1 wherein the grid pattern is adjacent to an interior surface of the automobile glazing unit.

7. The arrangement of claim 1 wherein the grid pattern is disposed within the automobile glazing unit.

8. The arrangement of claim 1 wherein the heating conductors have a width of between about 0.010 inches to about 0.060 inches.

9. The arrangement of claim 1 wherein the shorting bars have a width of about 0.030 inches to about 0.060 inches.

10. An arrangement for electrically heating a lower section of an automobile glazing unit comprising
    an electrically resistant grid pattern in thermal contact with an area of the lower section of the automobile glazing unit, the grid pattern having a plurality of horizontally spaced resistance heating conductors being about 0.01 inches to about 0.060 inches in width;
    bus bars disposed along and electrically connecting opposite edges of each of the heating conducts with the bus bars being connected to a power source to provide current flow through the bus bars and the heating conductors; and
    a set of vertically spaced shorting bars being about 0.030 inches to about 0.060 inches in width electrically intersecting at least two of the heating conductors at respective points having equal voltage potentials and having an absence of current flow through the vertically spaced shorting bars upon the power source providing current flow through the bus bars and the heating conductors, each vertically spaced shorting bar having an insignificant resistivity as compared to the heating conductors such that insignificant heat is generated upon current flow through each shorting bar as compared to heat generated by each heating conductor, grid pattern comprising electrically conductive enamel or ceramic materials having resistive portions of varying degree with the grid pattern being adjacent to an interior surface of the automobile glazing unit.

* * * * *